United States Patent [19]

Andersson et al.

[11] 4,329,199

[45] May 11, 1982

[54] PROCESS FOR DIGESTING AND BLEACHING CELLULOSIC MATERIAL WITH REDUCED EMISSIONS

[75] Inventors: Per-Erik Andersson; Fall E. I. Eriksson, both of Sundsvall, Sweden

[73] Assignee: SCA Development Aktiebolag, Sweden

[21] Appl. No.: 177,764

[22] PCT Filed: Mar. 2, 1979

[86] PCT No.: PCT/SE79/00046

§ 371 Date: Dec. 7, 1979

§ 102(e) Date: Nov. 15, 1979

[87] PCT Pub. No.: WO79/00899

PCT Pub. Date: Nov. 15, 1979

[30] Foreign Application Priority Data

Apr. 7, 1978 [SE] Sweden ............................. 7803920

[51] Int. Cl.³ .................... D21C 3/02; D21C 11/04; D21C 11/08; D21C 11/12

[52] U.S. Cl. .................................. 162/19; 162/30 K; 162/51; 162/DIG. 8; 423/207; 423/480; 423/DIG. 3

[58] Field of Search .............. 162/17, 19, 30 R, 30 K, 162/51, DIG. 8; 423/242 A, 207, 480, DIG. 3

[56] References Cited

U.S. PATENT DOCUMENTS

| | | | |
|---|---|---|---|
| 2,895,801 | 7/1959 | Northgraves et al. | 423/480 |
| 4,053,352 | 10/1977 | Hultman et al. | 162/30 K |
| 4,098,639 | 7/1978 | Noreus | 423/480 |
| 4,122,199 | 10/1978 | Dunnery et al. | 423/242 A |

OTHER PUBLICATIONS

"Industrial Gas Cleaning", Strauss; 2nd Ed. 1975, Pergamon Press p. 112.

Primary Examiner—Peter F. Kratz
Attorney, Agent, or Firm—Lerner, David, Littenberg & Samuel

[57] ABSTRACT

The digestion of the cellulose-containing material is performed with a digestion liquor containing sulphur and sodium followed by recovery and regeneration of said digestion liquor and bleaching of the cellulose-containing material with chlorine dioxide. The $SO_2$-containing and possibly chloride-containing gas from the recovery boiler (11) of the process and from combustion of evil-smelling gases (20) is absorbed in an absorption liquor containing and alkali metal salt solution free of sulphur or sulphur compounds such as sulphide or thiosulphate, in a scrubber (27). The resulting scrubber liquor is mixed with acid residual solution (26) from the manufacture of chlorine dioxide, whereby sulphur dioxide (32) in gaseous state is returned to the process, whereafter the residual solution (34) free from $SO_2$ is led to an evaporation and crystallization plant (35) for precipitation of alkali salts except chloride, substantially sodium sulphate, for obtaining a residual acid (37) consisting of chloride-containing sulphuric acid. The chloride-containing sulphuric acid is returned to the manufacture (19) of chlorine dioxide for generation chlorine dioxide, whereby the chloride content of the residual acid can be utilized.

9 Claims, 4 Drawing Figures

FIG. 4

SODIUM AND SULPHUR BALANCE OVER A SULPHATE PULP MILL
FOR THE MANUFACTURE OF FULLY BLEACHED SULPHATE PULP

| SUPPLIED | | | | INTERNALLY | | | REMOVED | |
|---|---|---|---|---|---|---|---|---|
| | NaOH | S | | NaOH | S | | NaOH | S |
| OIL | 0 | 1,0 | SULPHATE PULP MILL | | | LIQUOR LOSS | 13,9 | 2,4 |
| | | | | | | $O_2$ WHITE LIQUOR | 2,6 | 0,4 |
| | | | | 21,1 | 8,4 | $Na_2SO_4$ | | |
| | | | | 4,6 | 4,8 | RESIDUAL ACID TO | | |
| | | | | 9,2 | 1,5 | RESIN BOILING PLANT | | |
| | | | OXYGEN BLEACHING DEPARTMENT | | | LIQUOR LOSS | 9,2 | 1,5 |
| | | | | 0 | 9,9 | FLUE-GAS BEFORE SCRUBBER | | |
| NaOH TO SCRUBBER | 12,0 | 0 | RECOVERY BOILER SCRUBBER | | | | 0 | 2,5 |
| | | | | 12,0 | 7,4 | SCRUBBER LIQUOR | | |
| | | | $SO_2$-SEPARATION | 9,5 | 10,8 | RESIDUAL ACID | | |
| | | | CRYSTALLIZATION PLANT | 21,5 | 13,0 | | | |
| | | | | 0,4 | 4,6 | $H_2SO_4$ | | |
| $SO_2$ | 0 | 0,2 | $ClO_2$-PLANT | 0 | 5,2 | $SO_2$-GAS | | |
| $H_2SO_4$ | 0 | 5,6 | | | | | | |
| $NaClO_3$ | 13,7 | 0 | | | | | | |
| TOTAL | 25,7 | 6,8 | | | | | 25,7 | 6,8 |

PROCESS FOR DIGESTING AND BLEACHING CELLULOSIC MATERIAL WITH REDUCED EMISSIONS

In the manufacture of cellulose pulp according to the so-called sulfate process, as shown in the block diagram in FIG. 1, the wood chips are digested in the digester house 1 in a cooking liquor, the active constituents of which are sodium hydroxide and sodium sulfide. During the digestion the cellulose fibers are exposed, while the remaining constituents are dissolved and form the so-called black liquor. The cellulose pulp is separated from the black liquor in the pulp washing plant 2. The black liquor, which contains the inorganic chemicals of the cooking liquor together with the dissolved wood substance, is evaporated to a high dry content in the evaporation plant 10, whereafter the so-called thick liquor is led to the recovery boiler 11.

The wood contains some percentage of resin acid and fatty acid. In the alkali digestion, these resin and fatty acids are converted to corresponding sodium soaps, tall soft soap. This soap is difficult to dissolve in black liquor, and its solubility decreases with increasing dry content of the black liquor.

The soap, which has a high economic value, is separated in the pulp washing plant and evaporation plant. The separated soap is treated in the resin boiling plant 18 in a process, which is dealt with later on in this descriptive part.

During the process in the digester house and evaporation plant, volatile evil-smelling sulfur compounds are formed, which are to be blamed for the so-called sulfate smell in the ambient atmosphere of sulfate pulp mills. In recent years the sulfate pulp mills have been charged to collect these smelly gases and destroy them by combustion. This is carried out in the smelly gas combustion plant 20. These smelly gases can be combusted in a separate combustion furnace, whereby the sulfur leaves the system as $SO_2$ at position 24, or in the lime kiln where part of the sulfur of the smelly gases is absorbed in the lime of the lime sludge.

In the recovery boiler the inorganic chemicals of the thick liquor are converted substantially to sodium carbonate and sodium sulfide. A part of the sulfur supplied together with the thick liquor leaves the recovery boiler as sulfur dioxide together with the flue-gases at position 23. The organic substance of the thick liquor is combusted in the recovery boiler to carbon dioxide and water, which leave the recovery boiler together with the flue-gases at position 23.

In the manufacture of all bleached pulp, it is essential that the conditions during the digestion are such that as much as possible of the lignin is dissolved without degrading the cellulose pulp and affecting its strength. One such operation condition essential for the manufacture is the sulfidity of the white liquor, which is defined by the mole ratio $$\frac{Na_2S}{Na_2S + NaOH}$$

in the white liquor, where the contents are expressed in grams NaOH/liter. The definition is standardized, see SCAN, 2:63, Svensk Papperstidning 66 (1963), 786. The sulfidity of the white liquor is close to equal to the mole ratio

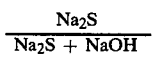

in the white liquor and black liquor system.

It was found by experiments, which were carried out by, among others, Annergren and Wilhelmsson, Svensk Papperstidning 77 (1974), 153, that it is very important in the manufacture of bleached sulfate pulp that the sulfidity is higher than 35% and preferably higher than 40%. By additional experiments it was found that, in normal sulfate pulp mills with a sulfidity in the white liquor of 30–40%, the mole ratio $S/Na_2$ in the white liquor and black liquor system is about equal with the sulfidity. More accurate studies have shown that the mole ratio $S/Na_2$ is about $1:1 \times$ sulfidity.

Further other studies, which were carried out in connection with the problem to be solved by the present invention, have proved the existence of a clear relation between the $SO_2$-emission with the flue-gases from the recovery boiler and the mole ratio $S/Na_2$ in the thick liquor supplied from the evaporation to the recovery boiler. This relation is illustrated in FIG. 2 and shown for four different recovery boilers, which were studied in this respect.

It is interesting to observe that with the mole ratio $S/Na_2$ of about 28–30% the $SO_2$-emission from the recovery boiler is very small. When, in the manufacture of bleached pulp, a mole ratio of about 40% is desired, the $SO_2$-emission is substantial, as can be seen in FIG. 2. Also, the further comment can be made that, in the manufacture of bleached sulfate pulp from pine wood, the amount of dry substance is about 1.4 ton/ton of 90% bleached sulfate pulp.

Further, as regards recovery boilers, the $SO_2$-emission inreases with decreasing dry content or increasing water content of supplied thick liquor. It is essential for a smooth continuous operation of the recovery boiler that the dry content of the thick liquor is maintained all the time at a high and uniform level.

The inorganic chemicals sodium carbonate and sodium sulfate are obtained in a molten state at the bottom of the recovery boiler, from where they are led to the dissolving tank 12 where the melt is dissolved in water or weak liquor and forms an aqueous soltuion, which substantially contains sodium carbonate and sodium sulfide. The solution is called green liquor 13 and is led to the causticizing plant.

After a sedimentation stage where the solid impurities of the green liquor are caused to settle, the liquor is mixed with quicklime, the lime of the lime sludge, in the slaking and causticizing stages 14 and 15. The lime sludge, which substantially consists of CaO, reacts with the water of the green liquor whereby calcium hydroxide is formed. This calcium hydroxide reacts with the sodium carbonate of the green liquor, whereby sodium hydroxide and calcium carbonate are formed. The calcium carbonate, which is a compound difficult to dissolve, is precipitated as a deposit, lime sludge.

The causticizing operation yields an aqueous solution, which substantially contains sodium hydroxide and sodium sulfide, and a sediment, lime sludge, which in its greatest part consists of calcium carbonate. In subsequent separation stages the aqueous phase, which now is called white liquor 16, is separated from the sediment. The white liquor is returned to the digester house for the digestion of new wood chips to cellulose pulp. The lime sludge is subjected to washing with water, whereafter the resulting aqueous solution, the weak liquor, is passed to the dissolving tank of the recovery boiler for dissolving the melt. The lime sludge is concentrated on filters or centrifuges to a high dry content and transported to the so-called lime sludge reburning kiln 17, where the lime sludge is dried and converted to quicklime, CaO, in the high-temperature zone of the kiln. The $CO_2$ formed is discharged with the flue-gases from the lime sludge reburning kiln. The quicklime is cooled and can be re-used for slaking and causticizing green liquor to white liquor.

The sodium and sulfur losses occurring the the system are replaced by supplying sodium sulfate 25 to the thick liquor before the recovery boiler. In order to prevent dilution of the thick liquor with water, the sodium sulfate is supplied in solid sate and maintained suspended in the thick liquor by heavy stirring.

In the pulp washing stage the pulp is freed from the main part of the black liquor and then possibly is subjected to screening operations 3 where knots, splinters, and shives, which were not dissolved in the digestion, are separated. The screened pulp is led to the bleaching department for bleaching.

The bleaching is carried out in several bleaching steps with intermediate washing steps. A usual bleaching sequence, for example, is bleaching in chlorine stage 4, alkali stage 5, chlorine dioxide stage 6, alkali stage 7 and chlorine dioxide stage 8.

Such bleaching operation proceeds as follows. The washed and possibly screened pulp is mixed with gas in a mixer before the chlorine bleaching tower. In the chlorine bleaching tower, chlorine and pulp are reacted with each other. After the chlorine tower, the pulp suspension is led to a washing step where the greater part of the impurities of the aqueous phase is removed from the pulp.

In connection with the washing, sodium liquor is added and mixed with the pulp. The alkaline pulp suspension is led to the alkali tower, in which the sodium liquor and the pulp are reacted with each other for a suitable time.

The pulp suspension is passed from the alkali tower to a washing step, chlorine dioxide solution is added to the pulp, and the reaction takes place in a bleaching tower. After the washing, sodium liquor is added, the pulp is washed, and further chlorine dioxide is added in the final bleaching stage.

The bleaching operation usually is divided into a prebleaching step, and a final bleaching step. The prebleaching step comprises the initial chlorine step and the first alkali step.

In prebleaching, the lignin is chlorinated in the chlorine stage. By such chlorination a great part of the lignin is converted to a state such as to be soluble in alkali. In the subsequent alkali stage these impurities are dissolved. The impurities are washed out from the pulp in the washing step and leave the system together with the waste water from the washing step of the first alkali stage.

The main part of the impurities removed from the pulp in the bleaching department is dissolved in the prebleaching steps and leaves the bleaching department with the waste water from the alkali washing step of the prebleaching stage via the alkali outlet 22. The waste water from the alkali washing step of the prebleaching stage via the alkali outlet 22. The waste water from the chlorine stage 21 contains a smaller amount of impurities.

In the final bleaching steps, which can comprise chlorine dioxide, alkali and chlorine dioxide steps, a relatively moderate removal of impurities takes place, while the whiteness of the pulp increases substantially in these stages.

Also, other bleaching sequences are used in bleaching. Sulfate pulp, for example, can be bleached in a bleaching sequence comprising chlorine, alkali, hypochlorite, chlorine dioxide, alkali and chlorine dioxide stages.

In the initial chlorine stage a mixture of chlorine and chlorine dioxide is usually used as bleaching chemical.

Some mills lately have replaced this method by bleaching the pulp, subsequent to the sulfate pulp washing, with oxygen gas in an initial bleaching step. The waste liquor from the washing step, after the oxygen gas bleaching step, is led to the washing department for the unbleached sulfate pulp. The bleaching sequences after the oxygen gas stage can be the same as in the case when no oxygen gas bleaching is applied. After the bleaching, the pulp is led to drying at 9.

As bleaching chemicals chlorine, chlorine dioxide, hypochlorite solutions and sodium liquor are used. Chlorine and sodium liquor usually are purchased from chlorine-alkali factories or are produced in chlorine-alkali factories situated in connection to the cellulose mill. Hypochlorite is produced by absorbing chlorine gas in sodium liquor. Chlorine dioxide is a very unstable compound which must be manufactured in connection with the place of consumption, which in the present case is the bleaching department.

Chlorine dioxide can be manufactured in several different ways. In Sweden primarily two different methods are applied, viz., the Olin-Mathieson process, and the SVP process. In the United States at present a process generally is used which is called the R2 process.

The manufacture of chlorine dioxide according to these processes is described by, among others, Atkinson, Simonette in Pulp & Paper, Apr. 22, 1968, and by Partridge, Atkinson and Schulz in Tappi, 54 (1971):9, p. 1484.

In the manufacture of chlorine dioxide according to the Olin-Mathieson process, sodium chlorate, sulfuric acid and sulfur dioxide are used as raw materials, and also, a small amount of chloride such as NaCl is added. As reaction product, chlorine dioxide is obtained, which is dissolved in water and used as bleaching liquor in the chlorine dioxide stages in the bleaching department. As a by-product a residual acid is also obtained which contains 1.30 kg $Na_2SO_4$/kg formed $ClO_2$, and 1.70 kg $H_2SO_4$/kg formed $ClO_2$.

In the manufacture of chlorine dioxide according to the so-called R2-process, where the raw materials are sodium chlorate, sodium chloride and sulfuric acid, the reaction products chlorine dioxide, chlorine and residual acid are formed in an amount corresponding to 0.58 kg $Cl_2$/kg formed $ClO_2$ and residual acid containing 2.30 kg $Na_2SO_4$/kg formed $ClO_2$, and 3.20 kg $H_2SO_4$/kg formed $ClO_2$.

Chlorine dioxide and chlorine leave the process in the form of a diluted gas. Chlorine dioxide is dissolved in water. The chlorine gas, which is much more difficult to dissolve in water, is absorbed in a subsequent absorption step in sodium liquor whereby sodium hypochlorite solution is formed. The R2 process, consequently, requires the bleaching department to include a hypochlorite stage, which can consume the hypochlorite solution formed.

In recent years another process has been proposed, the so-called SVP process, the raw materials for which are sodium chlorate, sodium chloride and sulfuric acid. By means of a special reactor design, chlorine dioxide, chlorine and sodium sulfate crystals are obtained as reaction products.

The SVP process yields 0.58 kg $Cl_2$/kg formed $ClO_2$, and 2.30 kg $Na_2SO_4$/kg formed $ClO_2$.

The residual acids from the Olin-Mathieson and the R2 processes are used to cleave tall soap in the resin boiling plant. Here, however, only a part of the residual acids can be consumed, and thus the greater part is led to the outlet.

In the manufacture of chlorine dioxide according to the SVP-process, sodium sulfate instead of residual acid is obtained and can be used in the sulfate process to compensate for sodium and sulfur losses.

In the resin boiling plant the tall soap is cleaved by cooking with sulfuric acid. From the tall soap cleaving, there are obtained tall oil (which is a valuable by-product) and cleavage oil consisting of sulfuric acid, sodium sulfate and various inorganic and organic chemicals from the black liquor accompanying the tall soap to the resin boiling plant. The cleaving acid is supplied to the black liquor in some way or another.

In the course of years, the cellulose industry has been regarded to be a serious threat to the environment, because of its emission of organic and inorganic impurities into the water and of foul-smelling impurities into the air.

In recent years great efforts have been made to reduce the effect of the sulfate pulp mills on the environment, which efforts were concentrated on (1) reducing the emission of black liquor by improving the pulp washing function, (2) collecting and treating the condensate from the digester house and evaporation plant (This technique has comprised the steps of treating the condensate, which was most impurified, with vapor in stripping sections and thereafter combusting the impurities. Condensates which were less impurified have been returned to the process.), and (3) collecting and combusting foul-smelling gases from the digester house and evaporation plant, whereby the foul-smelling sulfur compounds are combusted to sulfur dioxide and in many cases emited into the atmosphere.

These environmentally protective measures have substantially reduced the emission of organic matter into the water and of foul-smelling sulfur compounds into the air.

The environmental protection authorities now request new measures to be taken for protecting the environment. These new requirements will be discussed in the following by proceeding from FIG. 1, and they involve many problems as well as increasing manufacturing costs. The object of the present invention is to solve several of these problems.

The measures taken so far in the digester house, evaporation plant and pulp washing department have reduced to a substantial extent the emission of organic substances with black liquor and condensate. These digester house emissions have been reduced so much that the emissions from the bleaching department, which heretofore have been small compared with the digester house emissions, now are the dominating source of impurities with respect to emission to the receiving body.

By dividing the bleaching department outflows into section, the outflow systems can be closed so that the outflow from the bleaching department consists of two flows, viz., one acid outflow coming from the initial acid bleaching stage, indicated in FIG. 1 as chlorine bleaching stage, and one alkali outflow coming from the first alkali extraction step.

Of these two outflows, the alkali outflow is the smallest one with respect to volume, but it simultaneously contains the greatest amount of organic substance. To illustrate this, the following data from the measurement of impurity amounts in the bleaching of tall sulfate pulp can be reported.

| Outflow | Chlorine stage | Alkali stage | Proportion of total impurity in alkali stage outflow |
|---|---|---|---|
| COD, kg/ton pulp | 26 | 43 | 62 |
| Color, units/ton pulp | 27 | 95 | 78 |
| $BS_7$, kg/ton pulp | 9 | 7 | 44 |
| Total chlorine, kg Cl/ton pulp | 41 | 12 | 23 |
| Organic bonded chlorine, kg Cl/ton pulp | 5.2 | 2.2 | 30 |

The environmental protection situation with respect to the manufacture of bleached sulfate pulp can be summarized as follows. By available technology, the emissions into water and air from the digester house and evaporation plant can be managed, so that the inconveniences for the surroundings are very small. In the combustion of smelling gases from the digester house and evaporation plant, a $SO_2$-containing gas is obtained. The increasing acidification of lakes and rivers, which primarily is caused by the emission of $SO_2$ into the atmosphere, necessitates the restriction of $SO_2$ emission from industry and oil combustion. This implies that the cellulose industry probably will be requested to restrict the $SO_2$-emission.

The emission from the bleaching department into water now has become the greatest emission of impurities in the manufacture of bleached sulfate pulp. Methods now are being developed for cleaning these outflows.

In one method, the unbleached pulp is led after the pulp washing to an initial oxygen bleaching. The waste liquor resulting therefrom can be supplied without further action to the black liquor, so that emission from the oxygen bleaching step almost entirely can be eliminated.

In oxygen bleaching, however, the cellulose pulp is degraded to a higher degree than in the bleaching with chlorine-containing bleaching chemicals. It is, therefore, extremely important in oxygen bleaching that the pulp after the sulfate cooking is degraded as little as possible. As mentioned before, it then is necessary that the cooking takes place at high sulfidity. Also, in conventional bleaching, as already pointed out, a high and uniform sulfidity must be maintained in the chemicals system.

It is apparent from what has been explained above, that a high sulfidity maintained in the liquor system implies that the $SO_2$-emission from the recovery boiler will also be high. It then is necessary to drastically reduce the $SO_2$-emission from the recovery boiler in one way or another.

In recent years still a further serious environmental problem has been observed in the manufacture of bleached sulfate pulp. It was found that the waste water from the bleaching department contains toxic substances which, as more detailed studies indicate, consist of chlorinated aromatic and aliphatic compounds. The serious feature with these compounds is their lipophilic nature, i.e., they are soluble in fat and can accumulate in the tissue of live organisms. Further studies indicate that these impurities can have both mutagenic and carcinogenic properties, i.e., they affect hereditary genes and give rise to carcinogenic mutations in live cells.

Further investigations have shown that it is the bleaching chemical chlorine, which gives rise to the said chlorinated compounds in the waste water from bleaching departments. Experimental work in bleaching technology has proved that, from a bleaching point of view, chlorine can be replaced by chlorine dioxide in all bleaching stages. The investigations further have shown that chlorine dioxide in bleaching does not give rise to the said chlorinated toxic compounds. it can be expected, therefore, that chlorine will be replace by chlorine dioxide in the bleaching of cellulose pulp.

As appears from the aforesaid, there exist three alternative manufacturing processes for chlorine dioxide, in which sodium chlorate is used as raw material. Two of these processes yield a mixture of chlorine and chlorine dioxide. As is apparent from above, bleaching chemicals containing pure chlorine, for example chlorine or hypochlorite, probably cannot be used. The remaining process then is the chlorine dioxide manufacturing process called the Olin-Mathieson process, which can yield as final product a chlorine dioxide solution substantially free of chlorine.

A part of the residual acid, as mentioned above, is used for the cleaving of tall soap. The cleaving acid usually is supplied to the black liquor before or after the evaporation plant. The remainder of the residual acid normally is led to the outflow.

The residual acid from the Olin-Mathieson process contains 1.3 kg $Na_2SO_4$/kg formed $ClO_2$ and 1.7 kg $H_2SO_4$/kg formed $ClO_2$. The sulfuric acid concentration amounts to 440 g $H_2SO_4$/liter in the residual acid, and the $Na_2SO_4$ concentration amounts to 340 g $Na_2SO_4$/liter. The residual acid amount is about 3.8 liter residual acid/kg formed $ClO_2$.

When changing over to the bleaching of tall pulp with only chlorine dioxide, the chlorine dioxide consumption can be expected to be of the magnitude 25 kg chlorine dioxide/ton pulp. The residual acid then will contain: 33 kg $Na_2SO_4$/ton pulp, 43 kg $H_2SO_4$/ton pulp, and 58 kg water/ton pulp.

The tall oil yield usually amounts to about 40 kg tall oil/ton pulp, and the $H_2SO_4$ consumption to about 200 kg $H_2SO_4$/ton of tall oil produced in connection with the tall soap cleavage. The total sulfuric acid consumption in the resin boiling plant, consequently, will amount to about 8 kg $H_2SO_4$/ton pulp. Only about 20% of the residual acid amount can be consumed in the resin boiling plant.

A sulfate pulp mill with a production of 1000 ton bleached sulfate pulp/day receives as by-product at the chlorine dioxide manufacture 95 m³ residual acid/day. Only about 20 m³ of this residual acid can be consumed in the resin boiling plant.

The authorities probably will not permit the emission of so great amounts of strong sulfuric acid into the receiving body. Moreover, the residual acid contains valuable chemicals such as sodium and sulfur, which can be utilized in the chemicals system. The difficulty is to find the place where this return of residual acid can be effected.

In the foregoing part of this description, some requirements for environmental protective measures have been reported, which sulfate pulp mills will have to meet in the future. In satisfying these requirements, a large part of the emissions taking place today into water and air must be kept within the chemicals systems of the mills. This closing of the chemicals systems, with resulting reduced emission, will involve new problems difficult to solve if it is to be effected indiscriminately.

In the following, first the probable requests for environmental protective measures discussed above will briefly be summarized. Thereafter, follows a report on the problems which will arise when these requests are to be met by an undiscriminating closing of the mill. Finally, how these problems can be solved by the present invention will be described.

It can be expected that in the future the emission of $SO_2$ from the combustion of smelling gases will not be permitted. This $SO_2$ probably must be absorbed in alkaline aqueous solution and be recovered in one way or another.

In view of the pulp cooking and the pulp quality, sulfate pulp mills manufacturing fully bleached sulfate pulp must maintain a high sulfidity in their chemicals system. The $SO_2$-emission from the recovery boiler then will be important, as shown above. At the same time, the thick liquor, which is combusted in the boiler, must hold a dry content as high and constant as possible, because otherwise the $SO_2$-emission from the recovery boiler will increase additionally. In order to drastically reduce the $SO_2$-emission from the process, it will be necessary to absorb the $SO_2$ gas in an alkaline washing liquor in the scrubber 27, which normally is provided after the recovery boiler in a sulfate pulp mill for the manufacture of bleached sulfate pulp.

The $SO_2$ absorption in the scrubber will take place in the presence of a high oxygen content. A certain amount of absorbed $SO_2$ will be oxidized in the scrubber to sulfate, and an aqueous solution containing a mixture of sulfite and sulfate will be obtained from the scrubber. To be able to return this sulfite-sulfate solution to the chemicals system, the solution must be supplied to the system before the evaporation. The black liquor in the evaporation plant then will contain a higher content of inert salts, which bring about incrustations in the heat exchangers of the evaporation plant and simultaneously lower the calorific value of the thick liquor. It may then be necessary to reduce the dry content of the black liquor leaving the evaporation station. It has already been pointed out how important it is that the thick liquor supplied to the recovery boiler holds a high and uniform dry content. A lower dry content and a lower calorific value result in an increase of the sulfur dioxide emission from the recovery boiler. An increased chemical return brings about a still higher dry content, which can give rise to a vicious circle. It is, therefore, unusual for sulfate pulp mills to absorb sulfur dioxide to a high degree after the recovery boiler and to return the chemicals to the black liquor. This is one example where higher environmental requirements render process-technical problems in the system.

As already mentioned, the outflow from the bleaching department or, more preceisely, the alkaline outflow from the first alkali stage of the bleaching department is today the greatest individual impurity source from a modern sulfate pulp mill. Methods have been or are being developed for cleaning the alkaline outflow from the bleaching department. These methods imply that the outflow is concentrated by ion exchange or membrane filtering methods whereby primarily the organic substance is concentrated in a relatively small amount of water. The idea thereof is to supply this organic waste liquor to the black liquor system and after evaporation to combust it in the recovery boiler.

In experiments carried out with these cleaning methods, it is found that the recovered organic substance contains a certain amount of chloride. The supply of chloride to the liquor system results in the build-up of chloride, which gives rise to problems by increased corrosion, and also causes problems in the recovery boiler. It was found that an increased chloride content in the liquor system lowers the melting point of the melt in the recovery boiler and of the dust being removed from the recovery boiler to the electrostatic precipitator of the recovery boiler. Thereby the tendency of clogging and of melt deposits on heat exchanger surfaces of the recovery boiler increases, which in turn reduces the capacity of the recovery boiler. The recovery boiler is the most expensive single process equipment in a mill for manufacturing fully bleached sulfate pulp. It is, therefore, always tried to adapt the remaining process equipment so that the recovery boiler can be utilized at a maximum and operate with the highest possible load. A measure, by which the capacity of the recovery boiler is reduced, almost always necessitates a reduction of the productions capacity of the mill, which always implies negative economic consequences. It is, therefore, necessary to increase the ejection degree of chloride when the waste liquor from the bleaching department is supplied to the black liquor system.

With increasing efforts to close the mill systems and to reduce the emissions from the chemicals systems, the impurities will be stored in the chemicals system. According to investigations, with respect to chloride, the greatest ejection takes place via the flue-gases of the recovery boiler. This chloride ejection increases with increasing sulfidity and implies that the chloride leaves the boiler with the flue-gases in the form of hydrogen chloride.

As discussed above, the more severe requests for reducing the $SO_2$-emission to air will force the mills to pass the flue-gases of the recovery boiler and the flue-gases from the combustion of smelling gases to a scrubber for absorbing the sulfur dioxide of the flue-gas in a slightly acid, neutral or slightly alkaline scrubber liquor. In this $SO_2$ absorption, HCl in the flue-gases will also be absorbed in the scrubber liquor. When the scrubber liquor is transferred to the chemicals system, the chlorides are also returned, and the chloride buildup will cause problems.

Hydrogen chloride is easier to dissolve in water than $SO_2$. It has been proposed, therefore, to install in the absorption scrubber, before the $SO_2$ absorption step, a HCl absorption step where HCl is absorbed in heated water, which is to be led to the outflow. It was found, however, by experiments that such an absorption step at maximum can render a HCl absorption of about 50%. This ejection degree can be entirely unsatisfactory in many cases.

It is possible to prove by calculation that, when a mill having a certain chloride intake and no scrubber after the recovery boiler installs an $SO_2$ recovery system in which the scrubber liquor is returned to the liquor system, and at the same time installs a HCl absorption system with an absorption degree of 50%, the chloride content in the liquor system after such measures have been taken is twice as high as without such measures. With a high chloride intake, this can cause serious problems which may jeopardize the proper operation of the mill. As mentioned above, in the future probably only such chlorine dioxide processes will be applied which yield chlorine dioxide solution and chlorine dioxide substantially free of chlorine without any proper formation of chlorine gas. One such generally applied process is the Olin-Mathieson process, for example, which as shown above is a chlorine dioxide manufacturing process yielding a residual acid, of which residual acid only a small portion can be consumed in the chemicals system for cleaving tall soap. It is possible to supply the residual acid to the thick liquor after the evaporation, whereby, however, a certain precipitation of lignin from the thick liquor can occur and give rise to problems. Further, the thick liquor will be diluted in a way disturbing the operation of the recovery boiler, as pointed out above.

A further requirement to be met for obtaining a balanced operation of a sulfate pulp mill is that the chemicals supplied and removed, above all sodium and sulfur, must be in balance with the $S/Na_2$ ratio, the sulfidity, desired to be maintained in the chemicals cycle. The sodium losses must be replaced as they are removed from the system. The sulfur losses depend on the sulfidity and must be replaced as the sulfur is removed. As the sulfur losses depend on the sulfidity, it is consequently possible to control the sulfidity by adjusting the sulfur supply to the chemicals system. It can be proved that a sulfate pulp mill, which in its bleaching department has shifted to bleaching with substantially chlorine dioxide, and which supplied all of the residual acid to the chemicals system, will have sulfur excess in its system. With increased supply, the sulfidity in the system will rise to an undesired level. Also, the sulfur balances over the sulfate pulp mill prompt the residual acid problem to be solved in a different way.

It has then been proposed to evaporate the residual acid from chlorine dioxide manufacture. This should be possible to carry out, but it has not been applied yet on an industrial scale.

The environmental protection requirements can be summarized to have the consequences as follows:

(1) the cellulose pulp must be cooked with high sulfidity in the chemicals system, (2) the $SO_2$-emission into air must be restricted, (3) the bleaching of the cellulose pulp must be carried out substantially with chlorine dioxide, (4) the organic substance content of the outflow from the bleaching department must be concentrated and destroyed, (5) chloride thereby supplied to the chemicals system of the sulfate pulp will must be ejected, (6) emission of residual acid from chlorine dioxide manufacture into water will not be permitted, (7) the chemicals system obviously must be in balance, and (8) the black liquor cannot be permitted to receive impurities increasing the incrustation in the evaporation plant.

These requirements will give rise to many disturbances in the sulfate pulp mill. The present invention has the object to eliminate these disturbances without thereby causing a substantial increase in the costs.

The characterizing features of the invention become apparent from the attached claim.

According to an especially suitable embodiment thereof, the invention comprises the steps of:

Absorbing $SO_2$-containing gas from the combustion of foul-smelling gases and from the recovery boiler in absorption liquor containing an alkali metal salt in a scrubber or other absorption equipment, which does not include a separate HCl absorption stage, in a manner such that scrubber solution coming out of the scrubber holds a pH of 4:0–8:0, preferably 5.0–7.0;

Providing an absorption liquor supplied to the scrubber not including compounds of alkali metal and sulfur, such as sodium sulfate, e.g., the scrubber liquor consequently must not consist of oxidized white or green liquor;

Adding residual acid from the plant to the scrubber liquor (possibly after evaporation) for manufacturing chlorine dioxide in an amount such that the pH of the resulting solution is below 2.0–4.0, and that substantially all sulfite prevails as undissociated $SO_2$;

Separating the sulfur dioxide formed in a known manner in a separation equipment by means of gas or steam;

Preferably converting the separated sulfur dioxide to liquid $SO_2$, in that the separation is carried out with steam at about 3 bar pressure and the separated gas is cooled, whereby liquid $SO_2$ is condensed out;

Introducing the acid solution from the sulfur dioxide separation step to a multi-stage crystallization and evaporation plant, wherein the crystallization plant is provided also with remaining residual acid and wherein the plant is laid out so that sodium sulfate and sulfuric acid of about 75% are obtained as final products;

Returning the sodium sulfate to the sulfate pulp mill in substantially dry state for replacing the sodium losses of the sulfate pulp mill;

Returning the sulfuric acid to the chlorine dioxide manufacture for making new chlorine dioxide;

Returning to $SO_2$ recovered in the acidification of the scrubber liquor to the chlorine dioxide plant or using it in another way within the sulfate pulp mill; and Returning the chloride obtained in the scrubber liquor to the chlorine dioxide plant where it is consumed for forming new chlorine dioxide.

By the invention the following advantages are obtained:

1. The alkali supplied to the scrubber does not consist of oxidized white liquor or green liquor nor includes compounds such as sodium thiosulfate or sulfur, and therefore, the chloride-containing solution can be returned after evaporation to the chlorine dioxide manufacture, preferably after filtration or other mechanical cleaning.

2. Due to the fact that the scrubber liquor preferably is subjected to evaporation before acidification, a more complete separation of sulfur dioxide is obtained than if the acidification is carried out before the evaporation. At the same time a less qualified material can be chosen in the evaporation plant, as the evaporation occurs at a higher pH.

3. By the acidification and separation step after the evaporation, a concentrated $SO_2$ gas can be recovered, which can be utilized in the chlorine dioxide plant and in the bleaching department. The sulfur intake to the mill simultaneously can be reduced. By converting the sulfur dioxide to liquid $SO_2$, the intermediate storing of $SO_2$ is facilitated and optimum utilization of the same is made possible.

4. Due to evaporation and crystallization and simultaneous recovery of sodium sulfate in crystal state, the sodium sulfate in scrubber liquor and residual acid can be returned in dry state to the chemicals system without diluting the thick liquor with water. The sodium addition can also be controlled, because a sulfate excess can be stored or removed.

5. Due to the fact that the scrubber solution is not returned to the chemicals system of the sulfate pump mill, the chloride ejection is the greatest possible. All other measures such as HCl washing or the like will yield a certain chloride return. The same chloride ejection is obtained as in a sulfate pulp mill without a flue-gas scrubber. No sodium sulfate is supplied to the black liquor before the evaporation plant and brings about incrustations therein.

6. With the evaporation-crystallization plant being laid out in the way described below, it is easy to remove the sodium salts as sodium sulfate. In evaporation and crystallization of only residual acid, it is difficult, and above all expensive, to remove the sodium salts as sodium sulfate. The residual acid then has such a high mole ratio $S/Na_2$ that expensive recrystallization and washing steps are required for obtaining $Na_2SO_4$, which can be stored and sold, instead of the acid salts $Na_3H(SO_4)_2$ or $NaHSO_4$. By supplying a saturated solution containing a low mole ration $S/Na_2$, $Na_2SO_4$ crystals are obtained without a complicated washing and recrystallization process.

7. By returning the mother solution from the crystallization step which contains sulfuric acid of about 75% to the chlorine dioxide plant, the sulfuric acid again can be utilized in the chlorine dioxide manufacture. The sulfur intake to the mill thereby is still smaller, and a greater proportion of sodium sulfate crystallized out can be consumed.

8. The chloride washed out of the flue-gases of the recovery boiler are refound in the mother solution and led to the chlorine dioxide manufacture. In the chlorine dioxide plant, this chloride participates in the reactions and yields new chlorine dioxide, whereby the ejected chloride is utilized efficiently.

9. The sodium liquor supplied to the recovery boiler scrubber can contain a certain amount of chloride. The sodium liquor, therefore, without inconvenience may come from chlorine-alkali mills with manufacture in diaphragm cells.

The invention is described in the following by way of some examples and with reference to the accompanying drawings, in which:

FIG. 4 is a sodium and sulfur balance of a sulfate pulp mill for the manufacture of fully bleached sulfate pulp.

EXAMPLE 1

Figure 1:
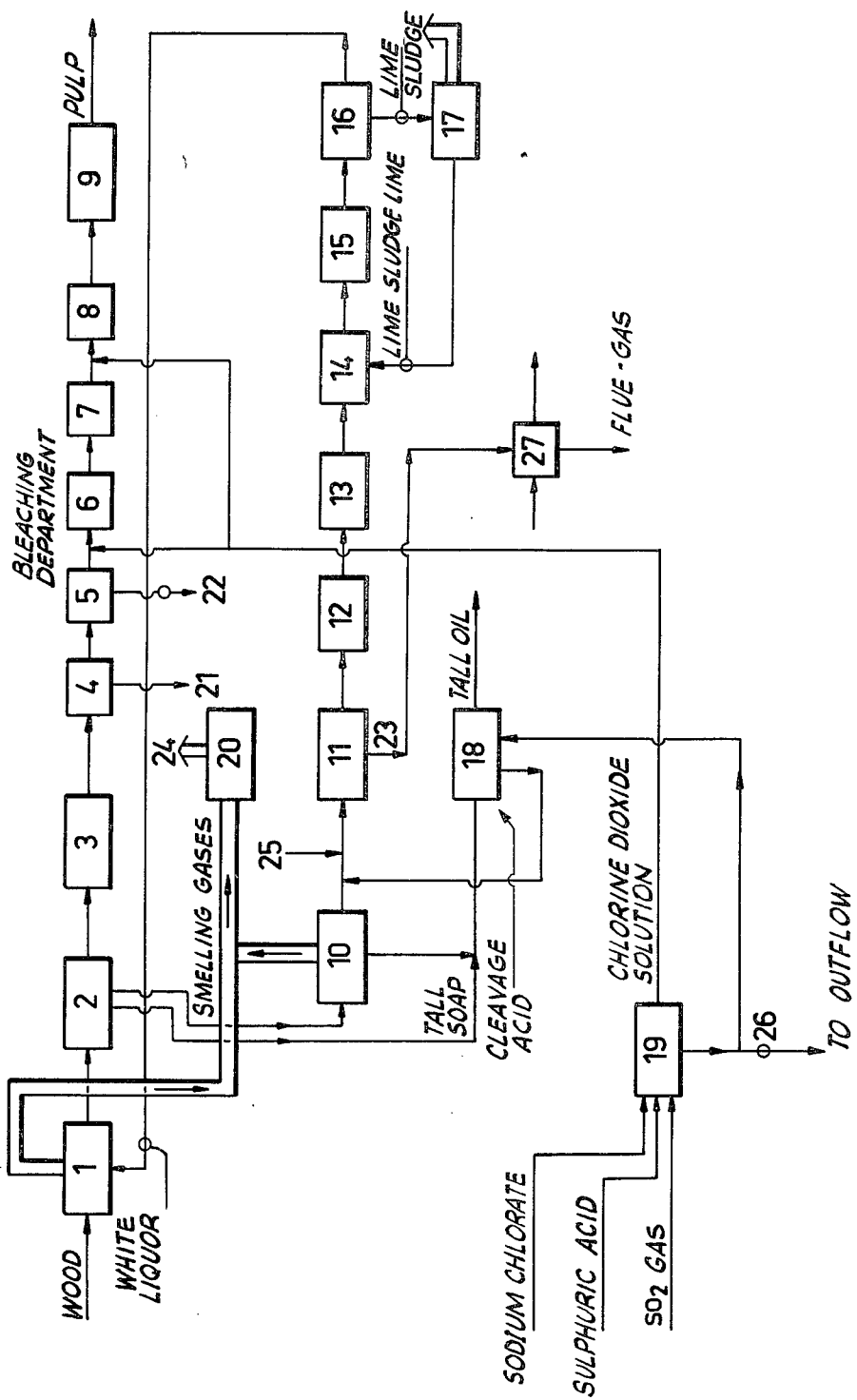
FIG. 1 is a flow sheet for a sulfate pulp mill.
Figure 2:
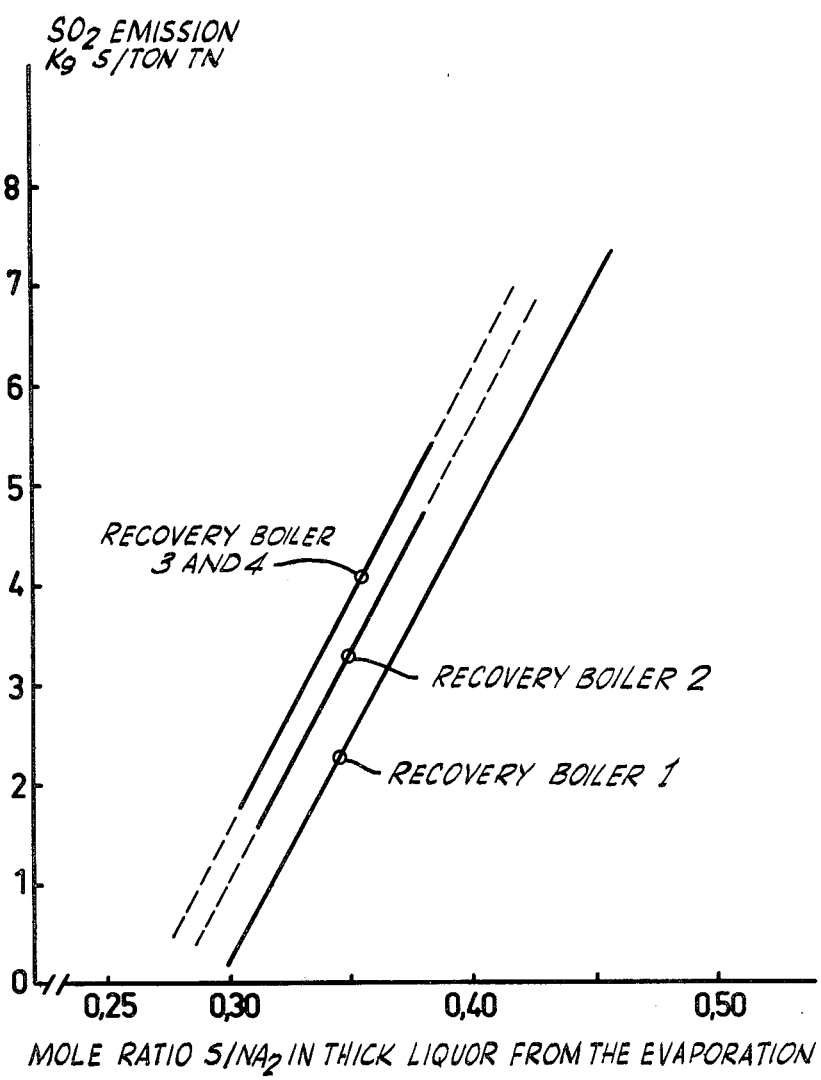
FIG. 2 is a diagram over $SO_2$-emission as a function of the mole ratio $S/Na_2$ in thick liquor.
Figure 3:
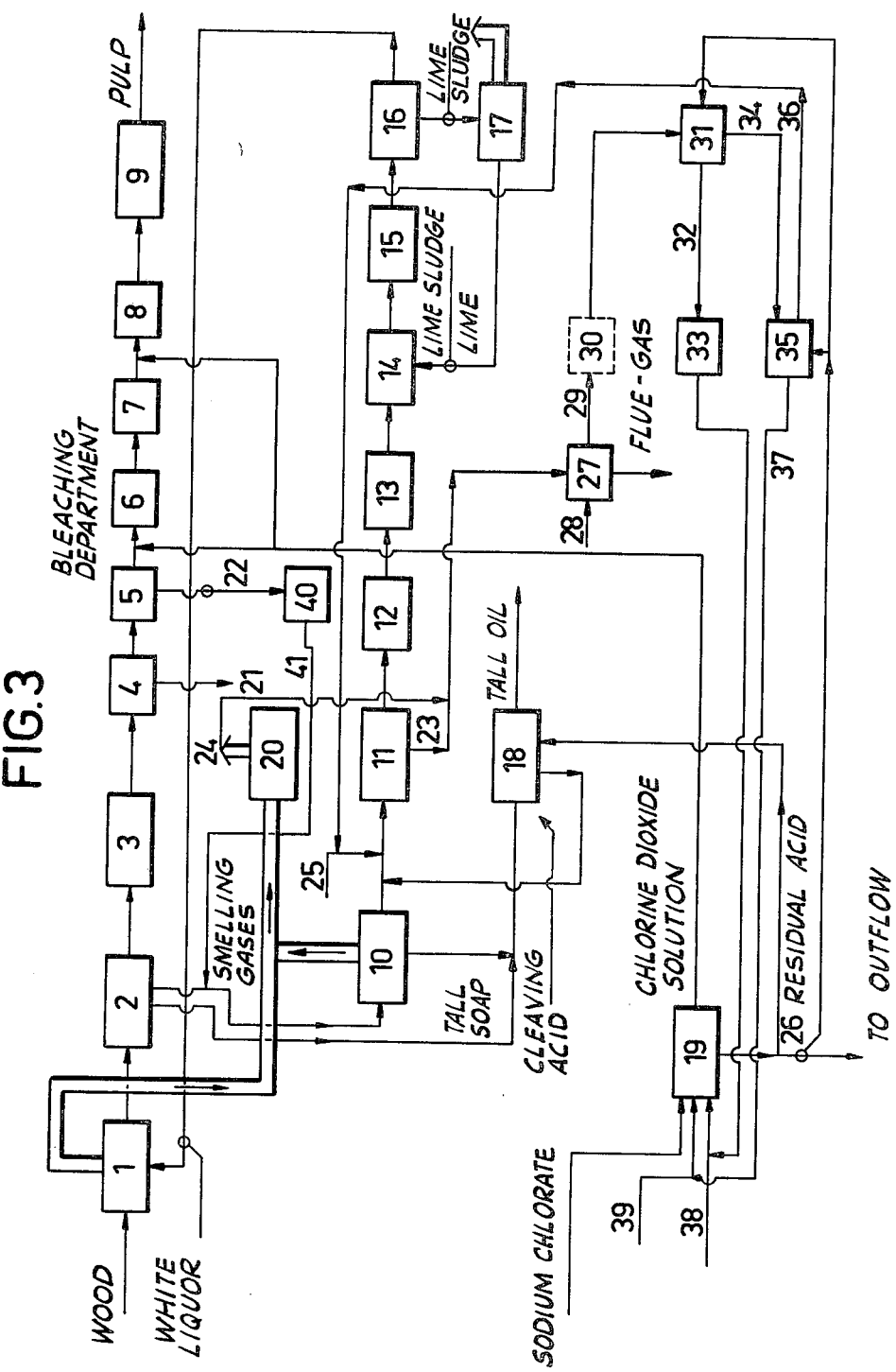
FIG. 3 is a flow sheet for a sulfate pulp mill, in which the present invention is applied.

FIG. 3 shows the present invention in applied state.

The $SO_2$-containing and possibly chloride-containing flue-gases 23 from the recovery boiler 11 as well as possibly the flue-gases 24 from the smelling gas combustion 20 are led to a scrubber 27 for the absorption of $SO_2$ and chloride. The absorption liquor 28 supplied to the scrubber consists of an alkali salt free of sulfur or sulfur compounds such as sulfide or thiosulfate. Preferably, a solution of sodium carbonate or sodium hydroxide can be used. The resulting scrubber liquor 29 is mixed with residual acid 26 from chlorine dioxide manufacture in a separation step 31. Possibly, the scrubber liquor 29 may first be passed through a pre-evaporator 30. In the separation step 31, sulfur dioxide 32 is separated in a manner known per se. It may be suitable for several reasons that the sulfur dioxide is converted to liquid $SO_2$. The separation step 31 then preferably is operated under pressure (about 3 bar) and the separation of $SO_2$ is carried out with steam. The sulfur dioxide then is passed to the plant 33 where the liquid $SO_2$ is condensed out by cooling, then is washed and stored. The resulting sulfur dioxide is used substantially in the chlorine dioxide plant 19 where it replaces the greater part of the sulfur dioxide 38, which normally is required in the chlorine dioxide plant for the generation of chlorine dioxide. From the $SO_2$ separation step 31, a residual solution 34 is obtained, which is led to a crystallization and evaporation plant 35. In this plant sodium sulfate 36 is crystallized out, which is returned to the recovery boiler 11 and more or less entirely replaces the sodium sulfate 26, which normally is added to the mill for replacing its loss of chemicals.

After sodium sulfate has been crystallized out, a residual solution 37 is obtained which substantially consists of sulfuric acid and some chlorides. This solution then is led to the chlorine dioxide plant 19 for the generation of chlorine dioxide. The chlorides in the solution thereby are converted to chlorine dioxide (chloride ejection), and the sulfuric acid in the solution replaces the greater part of the sulfuric acid 39, which normally is required in the chlorine dioxide plant 19 for the chlorine dioxide generation. At the same time as a chloride ejection has been achieved, the intake of chemicals to and the emission of chemicals from the mill have been reduced substantially.

In the attached FIG. 3, it also is indicated that the alkaline bleaching department outflow 22 can be led to a cleaning plant 40, and that the chloride-containing organic substance 41 from this plant is led to evaporation 10 for recovery and destruction in the recovery boiler 11.

It is to be pointed out that the return of bleaching department outflow per se is not a necessity for the invention. The great advantages of the invention, however, are accentuated by the possibility of returning bleaching department outflow, because the invention permits chloride ejection from the process.

EXAMPLE 2

A further example of the application of the present invention is described as follows.

In the future, sulfate pulp mills for fully bleached sulfate pulp probably will have the following process-technical layout and will be operated at the operation conditions given below.

In the sulfate pulp mill an $S/Na_2$ ratio, mole/mole, is maintained which amounts to about 0.4, in view of the pulp quality. The sulfur emission to the atmosphere is limited to 2.5 kg/ton pulp by leading $SO_2$-containing gases to a scrubber where the main part of the $SO_2$ amount is absorbed in alkali and returned to the process. In the scrubber, about 30% of the absorbed $SO_2$ amount is oxidized to sulfate, which is a normal value. Minor deviations from these operation conditions with respect to $S/Na_2$ ratio, $SO_2$ emission to the atmosphere, and oxidation in the scrubber have only a marginal effect on the balance of chemicals and on the conclusions made below.

Pulp, after the washing department of the sulfate pulp mill and possibly after the screening department, is led to a bleaching department where the pulp in subsequent steps is bleached with oxygen, chlorine dioxide, alkali, chlorine dioxide, alkali and chlorine dioxide. The total chlorine dioxide batching in the bleaching department amounts to about 48 kg active chlorine per ton pulp. Alkali for the oxygen step is manufactured internally of oxidation of white liquor. Alkali at the alkali steps can be added in the form of external soda lye.

The losses of chemicals from this future mill in the application of optimum technique can be as follows:

|  | NaOH kg/t pulp | S kg/t pulp |
|---|---|---|
| Liquor losses from sulfate pulp mill | 13.9 | 2.4 |
| Liquor losses from oxygen bleaching department | 9.2 | 1.5 |
| Sulfur dioxide from recovery boiler scrubber | 0 | 2.5 |
| Total losses | 23.1 | 6.4 |

These alkali and sulfur losses are replaced partly by the sulfur found in the oil supplied to the lime sludge kiln and supplied to the chemicals system by reaction with lime sludge and the lime sludge lime, and partly by the residual acid supplied to the resin boiling plant, and partly by other covering chemicals.

The following sodium and sulfur amounts are supplied to the sulfate pulp mill, together with oil sulfur to the lime sludge kiln and with residual acid to the resin boiling plant:

|  | NaOH kg/t pulp | S kg/t pulp |
|---|---|---|
| Sulfur supplied with oil to the lime sludge kiln | 0 | 1.0 |
| Residual acid from resin boiling plant | 4.6 | 4.8 |
| Total | 4.6 | 5.8 |

It is apparent from this information that the remaining demand of sodium and sulfur for covering the chemical losses of the sulfate pulp mill amounts to 18.5 kg NaOH/ton pulp and 0.6 kg S/ton pulp.

Available residual acid quantities amount to:

|  | NaOH kg/t pulp | S kg/t pulp |
|---|---|---|
| Total amount of residual acid | 13.7 | 15.4 |
| Residual acid to resin boiling plant | 4.6 | 4.8 |
| Available residual acid quantity | 9.1 | 10.6 |

A comparison between the remaining chemical demand for the sulfate pulp mill and the available residual acid quantity shows that there is room for the sodium of the residual acid in the chemicals system of the sulfate pulp mill, but not for the sulfur of the residual acid.

In order to achieve balance for this mill at complete residual acid recovery, the sulfur intake to the chlorine dioxide manufacture must be limited. This is possible by applying the present invention as follows.

To the flue-gas scrubber, after the recovery boiler, soda lye is supplied for $SO_2$ absorption. The resulting $NaHSO_3Na_2SO_4$ solution is acidified with residual acid. $SO_2$ is separated and led to the chlorine dioxide plant where it replaces fresh $SO_2$.

To the reaction mixture further residual acid is supplied. Sodium sulfate is crystallized out, and the strongly sulfurous mother liquor is returned to the chlorine dioxide plant where the sulfuric acid replaces fresh $H_2SO_4$. Sodium sulfate crystallized out is supplied to the black liquor.

A complete material balance is shown in FIG. 4, from which it appears that the sulfate pulp mill is substantially in balance. A certain insignificant alkali excess is obtained, which is removed from the system as oxidized white liquor and used in the bleaching department for replacing fresh NaOH.

By applying the present invention, thus, it is possible to obtain a sulfate pulp mill, which is protective for the environment and at the same time had a balanced chemicals system.

We claim:

1. A method for the digesting and bleaching of cellulose-containing material wherein the emissions therefrom and the demand for fresh chemicals therefor are reduced, said method comprising the steps of (1) digesting cellulose-containing material in a digestion liquor containing sulfur and sodium, to thereby produce a digested pulp mixture and gases containing sulfur compounds, (2) removing said gases containing sulfur compounds from said digestion step; (3) combusting said gases containing sulfur compounds produced in the digestion step so as to convert sulfur therein to sulfur dioxide gas; (4) separating the digested pulp mixture into digested pulp and a waste liquor; (5) combusting said waste liquor so as to convert sulfur therein to sulfur dioxide gas; (6) generating chlorine dioxide gas and producing acid residual solution as a by-product therefrom; (7) bleaching said separated digested pulp with said chlorine dioxide gas; (8) absorbing sulfur dioxide gas from said combusting steps (3) and (5) in a scrubber containing an absorption liquor comprising an alkali metal salt solution substantially free of sulfur and sulfur compounds to thereby form a scrubber liquor; (9) mixing the resulting scrubber liquor with the acid residual solution from the chlorine dioxide generating step, whereby sulfur dioxide gas and a residual solution free from sulfur dioxide gas are produced; (10) separating the sulfur dioxide produced in step (9) from said residual solution free from sulfur dioxide; (11) precipitating non-chloride alkali metal salts from said residual solution free from sulfur dioxide to thereby obtain a sulfuric acid solution containing chloride; and (12) recycling said residual sulfuric acid solution containing chloride from step (11) to said chlorine dioxide generating step (6), whereby the chloride content of said residual sulfuric acid solution is utilized.

2. A method according to claim 1, wherein the sulfur dioxide gas from step (10) is recycled for further use in said method.

3. A method according to claim 2, wherein said sulfur dioxide gas from step (10) is recycled to said chlorine dioxide generating step (6).

4. A method according to claims 1, 2 or 3, wherein said combusting step (5) also produces a melt which is separated and used in the preparation of digestion liquor for use in step (1).

5. A method according to claims 1, 2 or 3, wherein the pH of said scrubber liquor is from 4.0 to 8.0.

6. A method according to claims 1, 2 or 3, wherein said scrubber liquor is evaporated prior to mixing with said acid residual solution in step (9).

7. A method according to claim 6, wherein the pH of the mixture resulting from said mixing of said scrubber liquor and said acid residual solution is below 4.0.

8. A method according to claim 1 or 2, wherein said separated sulfur dioxide is cooled so as to condense it to liquid.

9. A method according to claim 1, wherein the precipitated alkali metal salts including sodium sulfate from step (11) are returned to said digestion step for replacing sodium losses in said digestion step.

* * * * *